(12) United States Patent
Mai et al.

(10) Patent No.: US 12,455,034 B2
(45) Date of Patent: Oct. 28, 2025

(54) METHOD FOR PROVIDING SYNTHESIS GAS BY MEANS OF AN ADDITIONAL ELECTRIC HEATER

(71) Applicants: thyssenkrupp Industrial Solutions AG, Essen (DE); thyssenkrupp AG, Essen (DE)

(72) Inventors: Martin Mai, Dortmund (DE); Klaus Nölker, Dortmund (DE); Bernd Keil, Dortmund (DE); Tarek El Hawary, Holzwickede (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 818 days.

(21) Appl. No.: 17/253,496

(22) PCT Filed: Jun. 25, 2019

(86) PCT No.: PCT/EP2019/066857
§ 371 (c)(1),
(2) Date: Dec. 17, 2020

(87) PCT Pub. No.: WO2020/002346
PCT Pub. Date: Jan. 2, 2020

(65) Prior Publication Data
US 2021/0254774 A1 Aug. 19, 2021

(30) Foreign Application Priority Data

Jun. 26, 2018 (DE) ...................... 10 2018 210 409.3
Aug. 10, 2018 (DE) ...................... 10 2018 213 463.4

(51) Int. Cl.
| F16L 53/38 | (2018.01) |
| B01J 19/00 | (2006.01) |
| B01J 19/24 | (2006.01) |
| C01B 3/38 | (2006.01) |
| C01C 1/04 | (2006.01) |

(52) U.S. Cl.
CPC ........... *F16L 53/38* (2018.01); *B01J 19/0013* (2013.01); *B01J 19/2415* (2013.01); *C01B 3/384* (2013.01);
(Continued)

(58) Field of Classification Search
None
See application file for complete search history.

(56) References Cited

U.S. PATENT DOCUMENTS

| 3,479,143 A | 11/1969 | Kelsall |
| 2016/0288074 A1* | 10/2016 | Vogel ...................... B01J 8/067 |
| 2021/0113983 A1* | 4/2021 | Mortensen ............... B01J 19/32 |

FOREIGN PATENT DOCUMENTS

| DE | 10 2015 004 121 A | 10/2016 |
| DE | 10 2015 013 071 A | 4/2017 |

(Continued)

OTHER PUBLICATIONS

English Translation of International Search Report issued in PCT/EP2019/066857, dated Sep. 9, 2019.
(Continued)

*Primary Examiner* — Colin W. Slifka
(74) *Attorney, Agent, or Firm* — thyssenkrupp North America, LLC

(57) ABSTRACT

A reformer for steam reforming a hydrocarbon-containing mixture, including a combustion chamber, a burner arranged within the combustion chamber, a first reactor tube which is arranged at least in sections within the combustion chamber, a catalyst arranged inside the first reactor tube, and an electrically heatable heating element is arranged inside the first reactor tube.

18 Claims, 7 Drawing Sheets

(52) U.S. Cl.
CPC ... *C01C 1/0488* (2013.01); *B01J 2219/00081* (2013.01); *B01J 2219/00083* (2013.01); *B01J 2219/00085* (2013.01); *B01J 2219/00135* (2013.01); *B01J 2219/00157* (2013.01); *B01J 2219/00162* (2013.01); *B01J 2219/0871* (2013.01); *C01B 2203/0233* (2013.01); *C01B 2203/061* (2013.01); *C01B 2203/068* (2013.01); *C01B 2203/0816* (2013.01); *C01B 2203/085* (2013.01); *C01B 2203/0855* (2013.01); *C01B 2203/0866* (2013.01); *C01B 2203/1047* (2013.01); *C01B 2203/1235* (2013.01)

(56) References Cited

FOREIGN PATENT DOCUMENTS

| EP | 0 830 893 A | 3/1998 |
|----|-------------|--------|
| EP | 1 055 637 A | 11/2000 |
| EP | 3 075 705 A | 10/2016 |
| WO | 2010/005165 A | 1/2010 |
| WO | 2010/104424 A | 9/2010 |
| WO | 2016/070989 A | 5/2016 |
| WO | 2017/036794 A | 3/2017 |

OTHER PUBLICATIONS

Kelling R. et al., "Ceramic counterflow reactor for autothermal dry reforming at high temperatures", (2016).

Dictionary of Science and Technology, edt. Christopher Morres, 1992, p. 1101, ISBN: 0-12-200400-0.

Ullmann's Encyclopedia of Industrial Chemistry, 2012, Wiley-VCH Verlag GmbH &Co. KGaA, Weinheim, DOI:10.1002/14356007. o02_o11.

Holleman, Wiberg, Lehrbuch der Anorganischen Chemie, 102 edition, 2007, pp. 662-665 (ISBN 978-3-11-017770-1).

\* cited by examiner

METHOD FOR PROVIDING SYNTHESIS GAS BY MEANS OF AN ADDITIONAL ELECTRIC HEATER

CROSS REFERENCE TO RELATED APPLICATIONS

This application is a U.S. National Stage Entry of International Patent Application Serial Number PCT/EP2019/066857, filed Jun. 25, 2019, which claims priority to German Patent Application No. DE 10 2018 213 463.4, filed Aug. 10, 2018 and German Patent Application No. DE 10 2018 210 409.3, filed Jun. 26, 2018, the entire contents which are incorporated herein by reference.

FIELD

The present disclosure generally relates to a reformer for the steam reforming of a hydrocarbon-containing mixture.

BACKGROUND

Ammonia is the second most widely produced synthetic chemical in the world (Ullmann's Encyclopedia of Industrial Chemistry, 2012, Wiley-VCH Verlag Gmbh &Co. KGaA, Weinheim, DOI: 10.1002/14356007.o02_o11, hereinafter "Ullmann's").

This ammonia is produced essentially from the elements hydrogen and nitrogen and an iron catalyst. The temperatures vary frequently in the range between 400° C. and 500° C. under a pressure over 100 bar. The key factor for the operating costs lies in the provision of hydrogen from synthesis gas production (Ullmann's, page 139).

Ammonia is preferably generated, accordingly, in the basic way described, for example, in Holleman, Wiberg, Lehrbuch der Anorganischen Chemie, 102 edition, 2007, pages 662-665 (ISBN 978-3-11-017770-1), based on the "Haber-Bosch process", from the elements in accordance with equation [1]:

$$3H_2 + N_2 \leftrightarrows NH_3 + 92.28 \text{ kJ} \quad [1]$$

The reactant nitrogen ($N_2$) may be obtained, for example, by low-temperature air separation or by reduction of oxygen in air by combustion. The hydrogen is obtained preferably via a "steam reforming process" in accordance with equation [2]:

$$C_nH_2m + nH_2O \leftrightarrows (n+m)H_2 + nCO \quad [2]$$

In the subsequent "carbon dioxide conversion" there is a further reaction in accordance with equation [3]:

$$CO + H_2O \leftrightarrows CO_2 + H_2 \quad [3]$$

The carbon dioxide ($CO_2$) formed in accordance with equation [3] serves preferably as a carbon dioxide source for the urea synthesis in accordance with equations [4] and [5].

$$2NH_3 + CO_2 \leftrightarrows H_2N\text{---}COONH_4 \quad [4]$$

$$H_2N\text{-}COONH_4 \leftrightarrows (NH_2)_2CO + H_2O \quad [5]$$

In the primary reformer, in the endothermic reforming reaction, methane is split by means of steam into hydrogen and carbon monoxide (and also, in part, $CO_2$). In the prior art it is customary for the necessary energy for heating the catalyst/gas/steam mixture to be accomplished exclusively by way of the reformer burners. The reformer burners, through the combustion of the air/natural gas mixture, transfer the heat by means of thermal radiation to the outer walls of the reformer tubes. These subsequently transfer the heat by means of thermal conduction to the catalyst and subsequently by convection to the gas/steam mixture. Considerable disadvantages of the system are the compromises between the maximum possible introduction of heat (wear driver) and the necessary introduction of heat. Inadequate introduction of heat has the effect that some of the water/natural gas mixture does not undergo catalytic reaction, referred to as "methane slip".

In practice, however, the plant operator is always concerned to have the reformer burners running at full load in order to produce as much synthesis gas as possible. This operation in turn can considerably reduce the lifetime of the reformer tubes. Moreover, the catalyst volume of a reformer tube is limited by the maximum possible internal tube diameter of the reformer tubes and also by the nature and quantity of the unilateral introduction of heat. A large tube diameter makes it possible to accommodate more catalyst per reformer tube, but in that case the heat that is present no longer entirely reaches the internal catalyst near to the tube axis.

The natural gas, moreover, is used for twin purposes. It serves on the one hand as heating gas for the endothermic steam reforming process and also, on the other hand, as a supplier of hydrogen for the synthesis gas production. In the long term this is problematic, since fossil fuels are finite and are associated with rising costs. A complicating factor is that when the primary reformer is fired with natural gas, $CO_2$ and nitrogen oxides are emitted. Future emissions limits may then become a problem for chemical plants unless the plants possess dedicated elements for air cleaning, which is very rarely the case. This problem area is therefore associated with additional capital costs and operating costs.

EP 1 055 637 A1 discloses a method for producing a synthesis gas stream rich in carbon monoxide and hydrogen, where a catalyst in a porous support structure is used.

EP 3 075 705 A1 discloses a method and a plant for steam reforming, wherein at least some of the feedstock stream outside the first steam reformer is heated at least partly using electrical energy.

EP 0 830 893 A1 discloses a catalyst charge for the reforming of hydrocarbon-containing vapor mixtures.

DE 10 2015 013 071 A1 discloses a furnace for the steam reforming of a hydrocarbon-containing feedstock stream, where an inductor for inductive heating is mounted on a tube section.

Thus, a need exists for a reformer which can be heated flexibly as a function of the changing energy supply and which at the same time exposes the reformer components to as little physical loading as possible.

DETAILED DESCRIPTION

Figure 1:
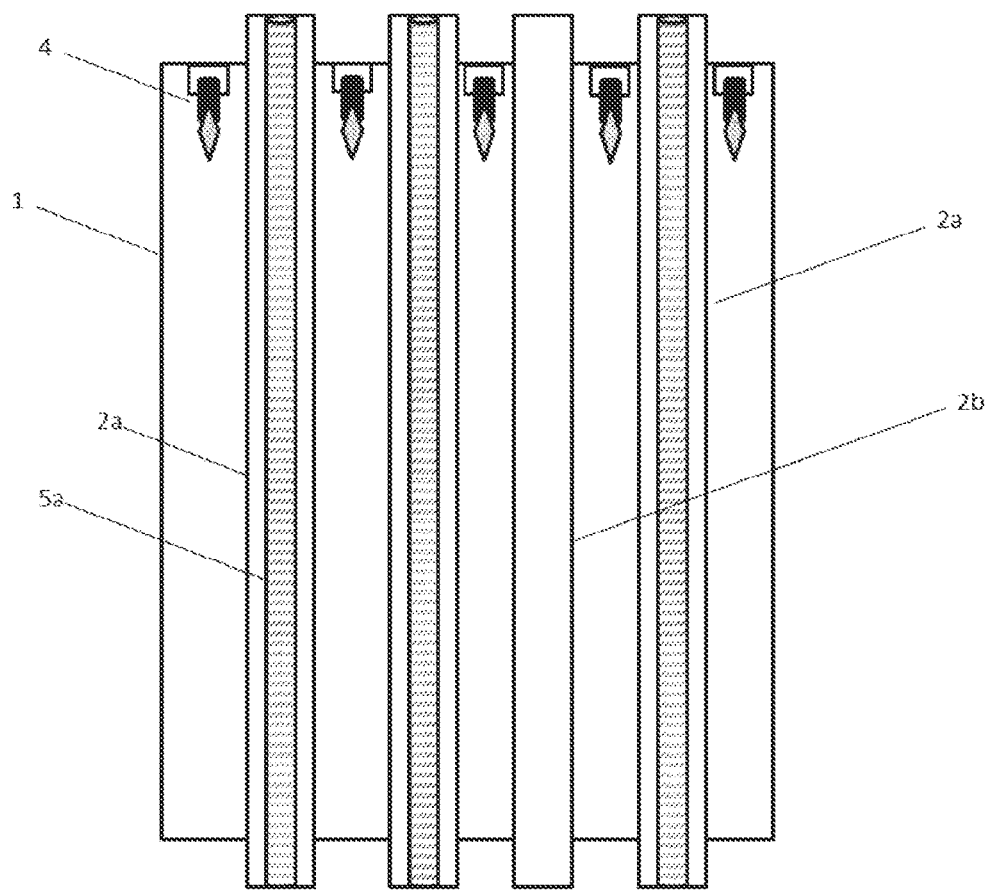
FIG. 1 is a schematic view of the reformer of the invention for the steam reforming of a hydrocarbon-containing mixture.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a reformer for the steam reforming of a hydrocarbon-containing mixture, to a plant for ammonia synthesis, hydrogen synthesis, methanol synthesis and/or as an ammonia synthesis-urea synthesis complex, to a method for producing synthesis gas, and to the use of the reformer of the invention for producing a synthesis gas mixture.

The invention additionally embraces a plant for ammonia synthesis, hydrogen synthesis, methanol synthesis and/or as an ammonia synthesis-urea synthesis complex.

The invention additionally embraces a method for producing synthesis gas. Further advantageous embodiments are found in the respective dependent claims.

The invention additionally embraces the use of the plant of the invention for producing a synthesis gas mixture in ammonia synthesis.

The reformer of the invention for the steam reforming of a hydrocarbon-containing mixture comprises at least the components below.

The fundamental construction of a reformer for providing hydrogen, preferably a primary reformer and a secondary reformer and/or an autothermal reformer, is known to the skilled person. The formation of hydrogen in this case takes place fundamentally according to the above equation [2]

$$C_nH_2m+nH_2O \leftrightarrows (n+m)H_2+nCO \quad [2]$$

A depiction of the functioning of the reformer is found for example in Ullmann's, chapter 6.1.1, pages 174 to 179. The reformer comprises a combustion chamber and at least one burner disposed within the combustion chamber. A first reactor tube is disposed at least sectionally within combustion chambers. The expression "at least sectionally" means in the sense of the invention that at least part or the whole part of the first reactor tube runs within the combustion chamber. In general only a partial section of the first reactor tube passes through the combustion chamber; in other words, the first reactor tube is led into the combustion chamber and then led out of the combustion chamber. Disposed within the first reactor tube is a catalyst, based for example on nickel oxide on a support material. The reformer of the invention is characterized in that an electrically heatable heating element is disposed within the first reactor tube. The reformer tubes are under an inner overpressure. Since the tensile strength of steel decreases sharply as the outer wall temperature of the tube goes up, there is an upper limit on the density of heat flow on the outer and inner wall of the tube. If this upper limit is exceeded, there is a rapid drop in the lifetime of the tube. By virtue of the additional inner electrically heatable heating element in accordance with the invention, the restriction governing the inner wall and outer wall diameters can be eliminated; the status today is limited by the maximum possible introduction of heat and must always be designed so as to take account of pressure/temperature/wear. The invention therefore enables an improved temperature profile over the cross section of the catalyst bed. The catalyst, then, is utilized more effectively and so reduces the methane slip with a lower outer thermal load on the reformer tubes.

Preferably, additionally, there is a second reactor tube with a catalyst disposed within the second reactor tube, without an electrically heatable heating element as described above. The invention therefore also embraces the combination of first reactor tubes with electrical heating elements and second reactor tubes without electrical heating elements.

In one preferred embodiment, the first reformer tube, in the region of the electrically heatable heating element, has protrusions or constrictions. These protrusions or constrictions enable an individually adjustable heating of individual sections of the first reformer tubes.

The electrically heatable heating element preferably comprises an inductively heatable heating element. The expression "inductively heatable" in the sense of the invention preferably embraces "the heating of electrically conductive materials by induced high-frequency currents within the material" (Dictionary of Science and Technology, edt. Christopher Morres, 1992, p. 1101, ISBN: 0-12-200400-0). More preferably the inductively heatable heating element has at least one heating tube (for example containing ceramics, glass and/or metals) and, wound at least sectionally around the heating tube (6), a metallic wire and/or a metallic coating (7b), more preferably in the form of coillike conductor tracks. The metallic wire and/or the metallic coating are preferably connected to an electrical alternating current source.

The heating tube preferably has an at least sectionally metallic surface. The metallic surface improves the thermal conduction from the heating tube into the catalyst bed of the first reactor tube.

With more particular preference, the metallic (electrically conductive) wire lies on the heating tube via notches. The notches improve the fastening, "adhesion" of the metallic wire on the heating tube.

The ratio of diameter of the first reactor tube, $Ø_{2a}$, to the diameter of the heating tube, $Ø_6$, expressed as $Ø_{2a}/Ø_6$, is preferably from 100 to 2, more preferably from 10 to 5.

In one preferred embodiment, the metallic wire and/or the metallic surface and/or the metallic coating comprises iron, cobalt, nickel, copper, silver, chromium, and also semimetals such as graphite, silicon and ceramic coatings.

The metallic wire and/or the metallic coating are preferably connected to an electrical alternating current source.

The electrical heating element preferably comprises an electrical resistance heating element. This element preferably comprises an ohmic resistor and may be configured for example in the form of a metal wire or metal plate. The electrical resistor may be connected to an alternating current source and to a direct current source. The heat that is liberated when current flows through the electrical resistor is utilized in order to heat the electrical resistance heating element and also the surrounding catalyst bed. By virtue of the additional inner electrically heatable heating element in accordance with the invention, the restriction governing the inner wall and outer wall diameters can be eliminated; the status today is limited by the maximum possible introduction of heat and must always be designed so as to take account of pressure/temperature/wear. The invention therefore enables an improved temperature profile over the cross section of the catalyst bed. The catalyst, then, is utilized more effectively and so reduces the methane slip with a lower outer thermal load on the reformer tubes.

More preferably the electrical resistance heating element comprises an electrical heating resistor and a heating jacket. The electrical heating resistor preferably comprises metallic conductors. The heat in this case is delivered in line with the material-specific resistance. The electrical heating resistor, in the form for example of a metal plate or a metal-coated ceramic plate, is surrounded by a heating jacket. The heating jacket, comprising—for example—suitable ceramic materials, prevents direct contact with the catalyst bed and the occurrence of "hotspots" on the catalyst. The expression "suitable ceramic materials" preferably embraces ceramic materials or material mixtures with ceramic fractions that are known to the skilled person and that are stable or exhibit only little physical wear at the operating temperatures of the reformer. Illustrative ceramics may contain $Al_2O_3$, MgO, $ZrO_2$, aluminum titanates, silicides, carbides, nitrides, etc.

The heating jacket preferably comprises electrical insulators, preferably oxide ceramics and/or nonoxide ceramics.

In a further embodiment, the electrical resistance heating element (5b) comprises a first electrical heating resistor and a second heating resistor, more preferably further heating resistors. The first electrical heating resistor and the second electrical heating resistor may have different dimensions. This includes, for example, different lengths and diameters, or else the arrangement of the electrical heating resistors in the electrical resistance heating element. By way of this arrangement it is possible to achieve different and adaptable heating powers on the part of the electrical resistance heating element.

The catalyst preferably comprises a ferromagnetic catalyst, preferably iron, cobalt, nickel and/or compounds and/or mixtures thereof. Using a ferromagnetic catalyst makes it possible to carry out direct heating and hence enables better temperature distribution of the catalyst in the heating tube and in the electromagnetic induction field generated therein.

The invention further embraces a plant for ammonia synthesis, hydrogen synthesis, methanol synthesis and/or as an ammonia synthesis-urea synthesis complex, comprising a reformer of the invention as described above.

The invention further embraces a method for producing synthesis gas, at least comprising the following steps: in a first step a), a hydrocarbon-containing starting mixture, more preferably natural gas, and steam are provided. In a subsequent step b), a reformer as described above is charged with the provided hydrocarbon-containing starting mixture and steam. The fundamental operating conditions are found for example in Ullmann's, chapter 6.1.1, pages 174 to 179. Thereafter, in step c), a synthesis gas mixture is obtained, preferably a synthesis gas mixture comprising the components according to equation [2]. The method is suitable for use in plants for ammonia synthesis, hydrogen synthesis, methanol synthesis, and in ammonia-urea synthesis complexes (i.e., combined plants for the synthesis both of ammonia and optionally carbon dioxide and also for the synthesis of urea from ammonia and carbon dioxide).

The charging in step b) takes place preferably at a temperature of 300° C. to 700° C. under a pressure of 20 bar to 50 bar.

The invention further embraces the use of the reformer of the invention for producing a synthesis gas mixture.

FIG. 1 shows a schematic drawing of the reformer of the invention for the steam reforming of a hydrocarbon-containing mixture. The reformer comprises a combustion chamber (1) and burners (4) disposed within the combustion chamber. A first reactor tube (2a) is disposed at least sectionally within the combustion chamber (1). The expression "at least sectionally" means in the sense of the invention that at least a part or the whole part of the first reactor tube runs within the combustion chamber (1). Disposed within the first reactor tube (2a) is a catalyst (3), not shown. Also disposed within the first reactor tube (2a) is an electrically inductively heatable heating element (5a). In addition, furthermore, there may be second reactor tubes (2b) with catalyst (3), not shown, which for reasons of cost or for temperature control, for example, may include no inductively heatable heating element (5a).

Figure 2:
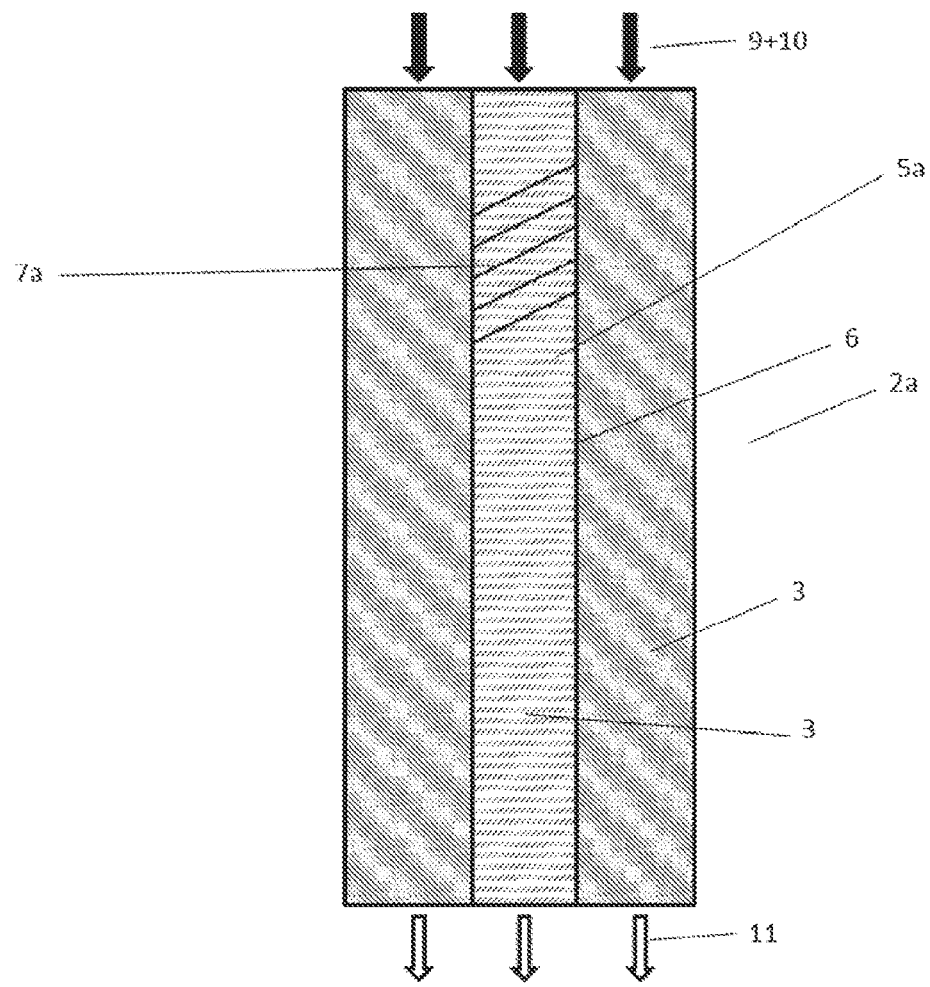
FIG. 2 is a schematic view of the first reactor tube of the invention.

FIG. 2 shows a schematic drawing of the first reactor tube (2a) of the invention. Located within the first reactor tube (2a) is a catalyst (3) and an inductively heatable heating element (5a). The inductively heatable heating element (5a) comprises a heating tube (6), a metallic wire (7a) wound at least sectionally around the heating tube (6) like a coil (or metallic coating (7b)) and may likewise be filled with the catalyst (3). In principle, the catalysts (3) within the inductively heatable heating element (5a) and within the space between the inductively heatable heating element (5a) and the interior of the first reactor tube (2a) may be identical or else different. The metallic wire (7a) wound like a coil around the heating tube (6) is connected to an alternating current source, not shown. The heating of the heating tube (6) via the wound metallic wire (7a) allows the first reactor tube (2a) to be heated from the inside and therefore lowers the physical stresses through the simultaneous introduction of heat on the part of the burners (4). A hydrocarbon-containing starting mixture (9) and steam (10) enter the first reactor tube (2a) and depart the first reactor tube (2a) as a synthesis gas mixture (11).

Figure 3:
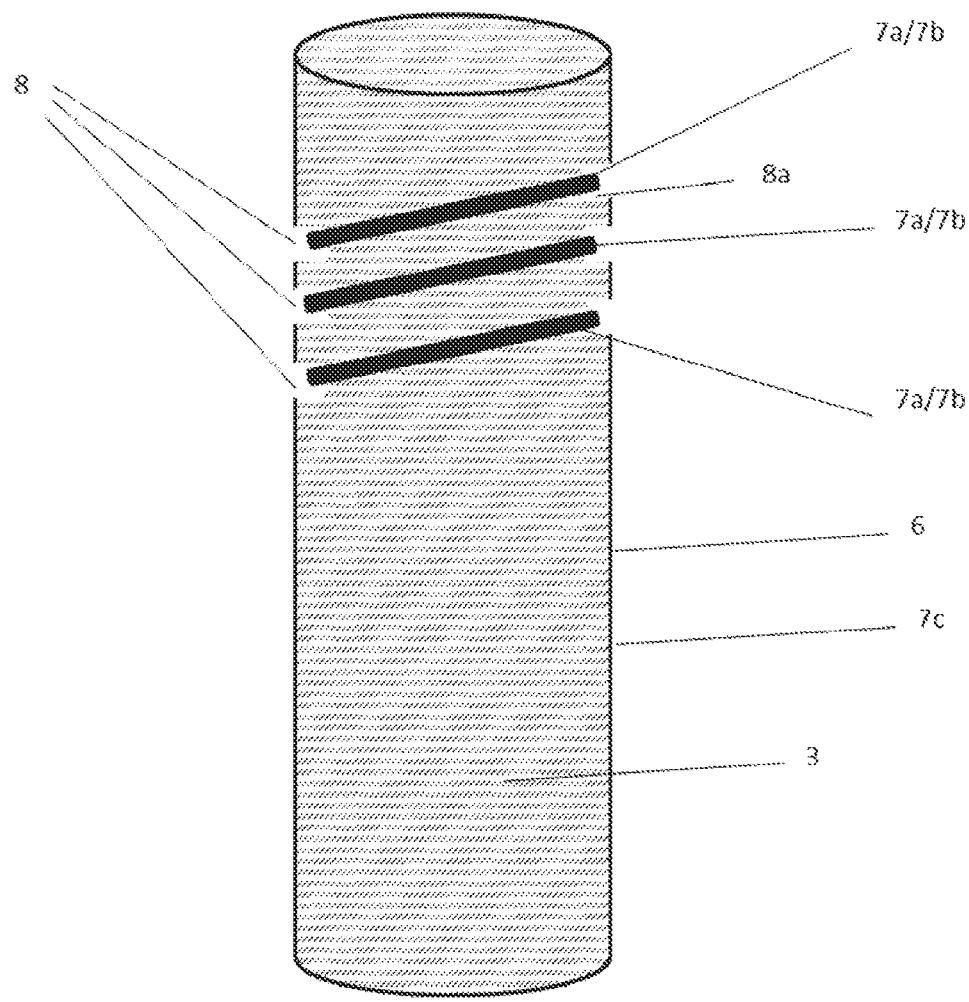
FIG. 3 is an enlarged detail view of the first reactor tube.

FIG. 3 shows an enlarged detail of the first reactor tube (2a). The heating tube (6) is filled (optionally) with catalyst (3) and at least sectionally, for better thermal conduction, has a (thermally conducting) metallic coating (7c). The metallic wire (7a) wound like a coil around the heating tube (6) is connected to an alternating current source, not shown. Notches (8) in the heating tube (6) improve the hold of the metallic wire (7a) on the surface of the heating tube, and additionally this creates a planar surface (8a), which allows improved transfer of heat by means of thermal conduction.

Figure 4:
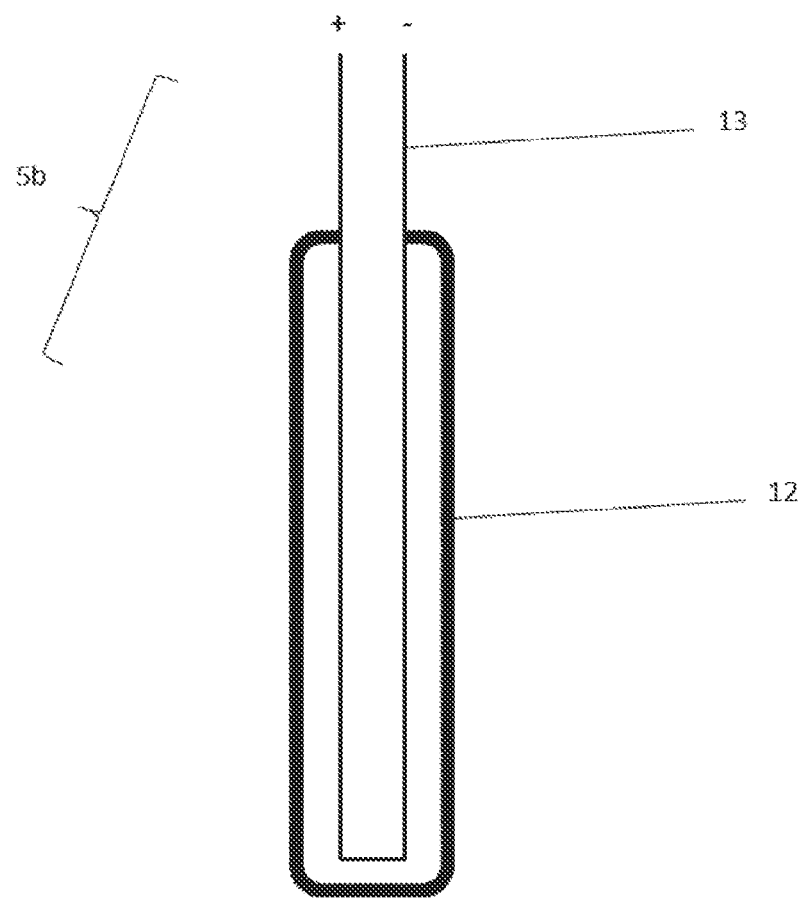
FIG. 4 is an enlarged detail view of the electrical resistance heating element.

FIG. 4 shows an enlarged detail of the electrical resistance heating element (5b). The electrical resistance heating element (5b) comprises an electrical heating resistor (13) and a heating jacket (12). The electrical heating resistor (13) may be electrically connected to a direct current source (indicated by +−) or an alternating current source, not shown.

Figure 5:
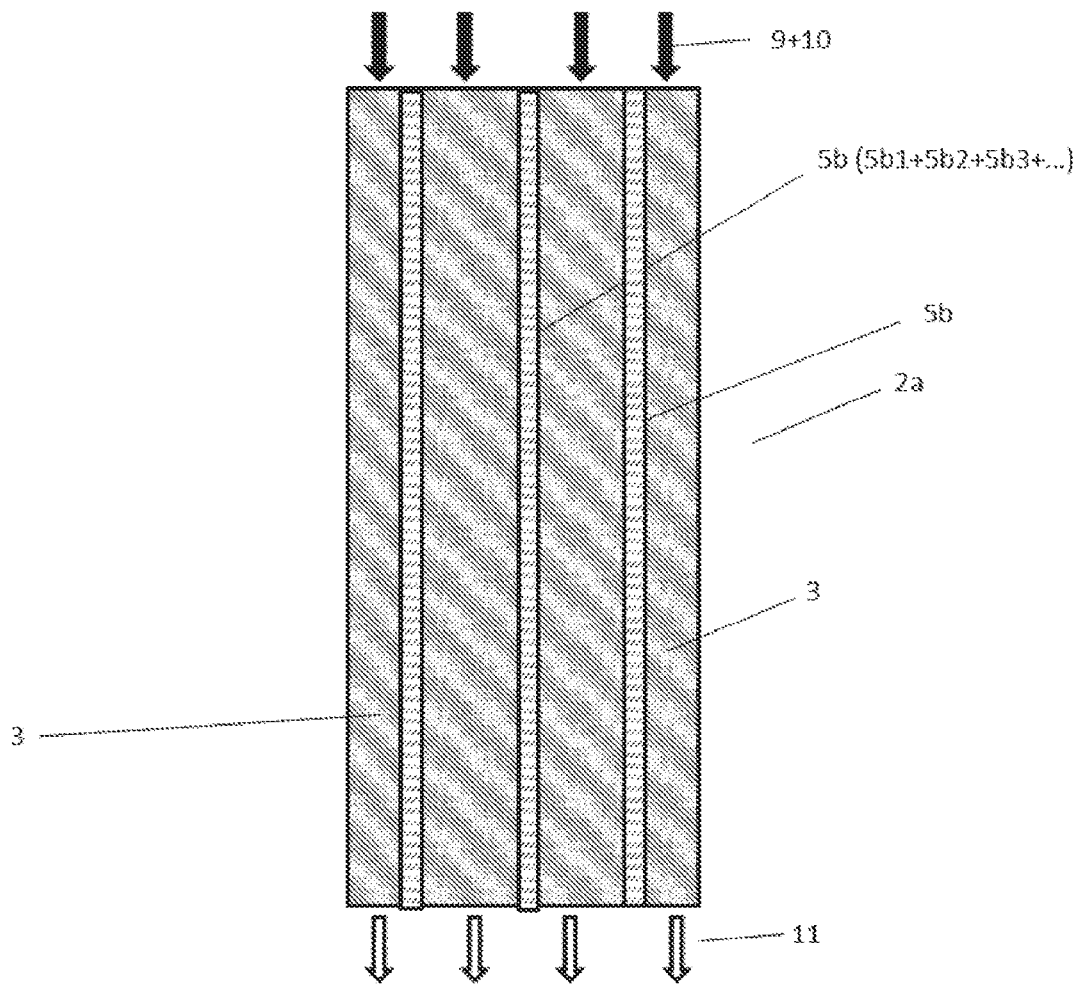
FIG. 5 is a schematic view of a further embodiment of the first reactor tube of the invention.

FIG. 5 shows a schematic drawing of a further embodiment of the first reactor tube (2a) of the invention. Disposed within the first reactor tube (2a) is a catalyst (3). The electrical resistance heating element (5b) shown in FIG. 4 is disposed within the catalyst (3) and enables a more uniform heating of the catalyst (3) and reduces the physical stresses occurring within the first reactor tube (2a). The electrical resistance heating element (5b) may be configured, as shown in FIG. 5, as separate elements in each case or else as a connected totality, connected in series or in parallel, of respectively individual electrical resistance heating elements (5b1+5b2+5b3+ . . . ).

Figure 6:
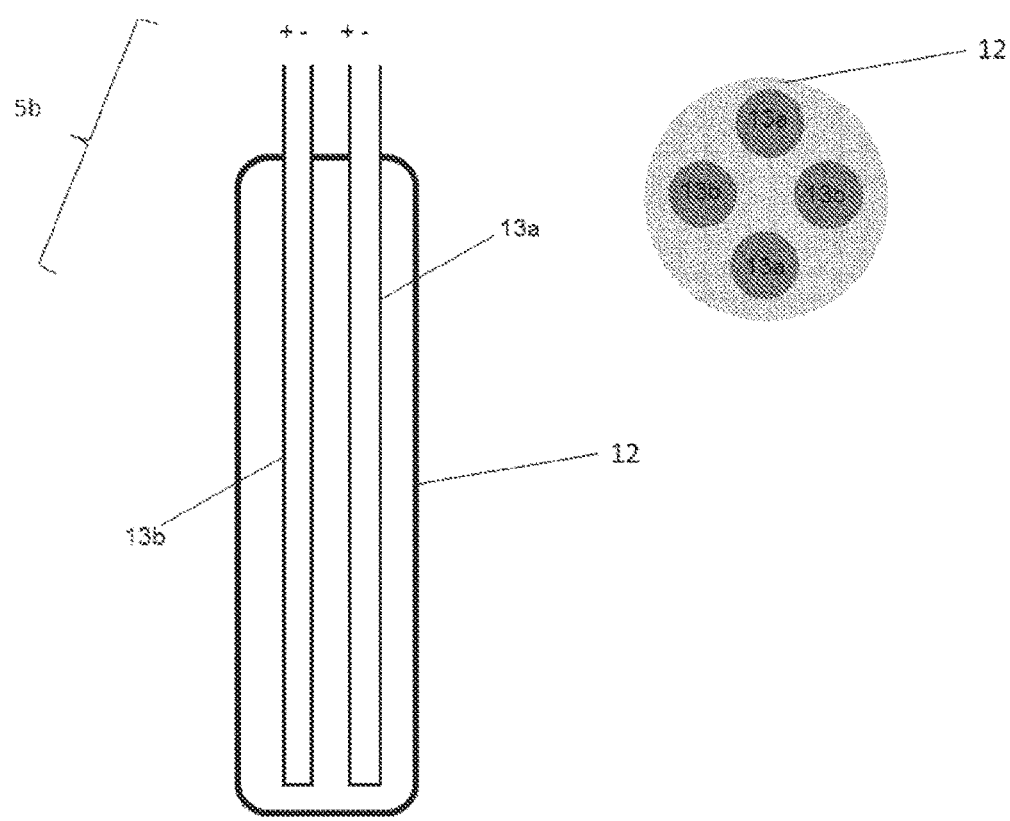
FIG. 6 is an enlarged detail view of a preferred electrical resistance heating element.

FIG. 6 shows an enlarged detail of a preferred electrical resistance heating element (5b). The electrical resistance heating element (5*b*) comprises a first electrical heating resistor (13*a*), a second electrical heating resistor (13*b*) and a heating jacket (12). The electrical heating resistors (13*a*/13*b*) may be electrically connected to a direct current source (indicated by +−) or to an alternating current source, not shown. The electrical resistance element (5*b*) may also comprise a plurality of first and second heating resistors (13*a*/13*b*). This is indicated schematically in the circle. The first electrical heating resistor (13*a*) and the second heating resistor (13*b*) may have different dimensions. This includes, for example, different lengths and diameters or else the arrangement of the electrical heating resistors (13*a*/13*b*) in the electrical resistance heating element (5*b*). By way of this arrangement it is possible to achieve different and adaptable heating powers on the part of the electrical resistance heating element (5*b*).

Figure 7:
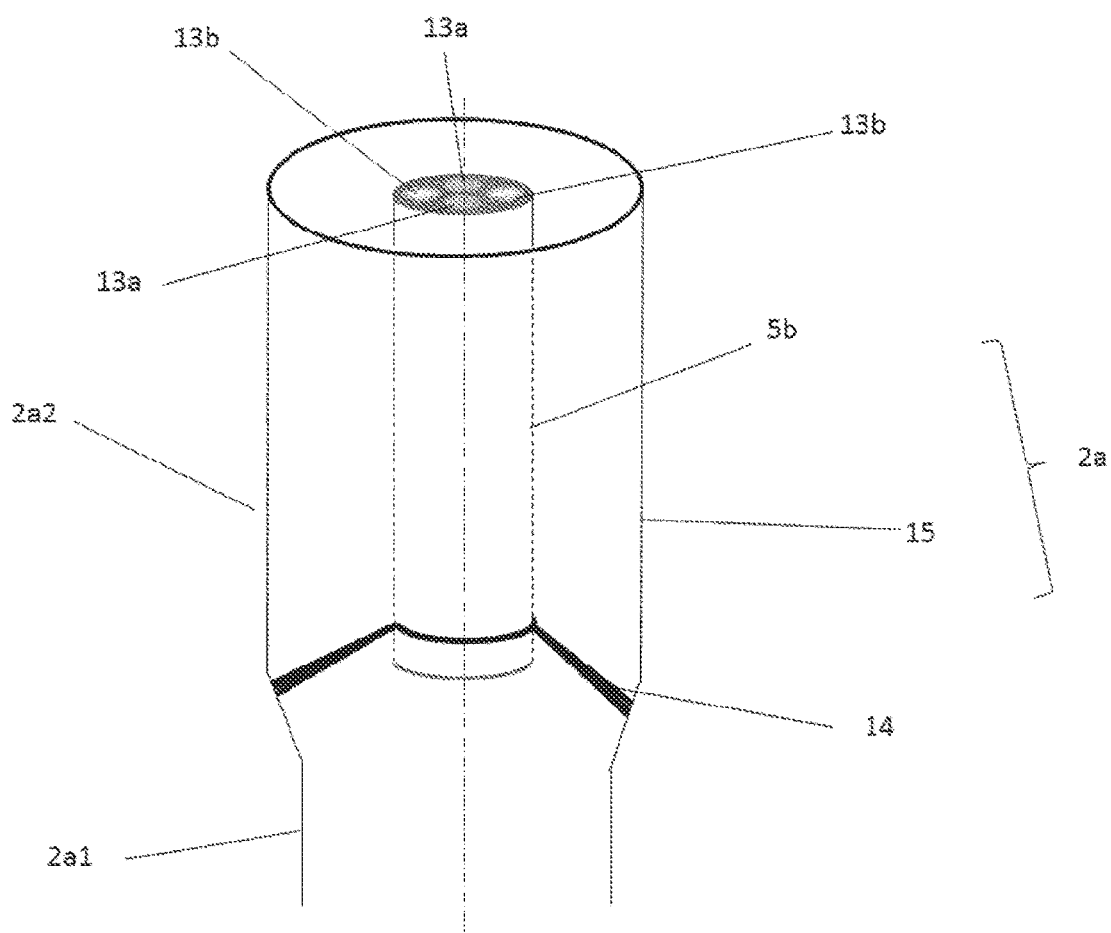
FIG. 7 is a schematic view of a preferred first reactor tube.

FIG. 7 shows a schematic drawing of a preferred first reactor tube (2*a*). The electrical resistance element (5*b*) comprises a plurality of first and second heating resistors (13*a*/13*b*). These heating resistors (13*a*/13*b*) are preferably different in their dimensions in terms of the heating power. The electrical resistance element (5*b*) is disposed in the first reactor tube (2*a*) via an electrical contacting/mechanical securement (14). The first reactor (2*a*) has a protrusion (15) in the region of the electrical resistance element (5*b*). These protrusions (15) or else constrictions enable an individually adjustable heating of individual sections of the first reformer tubes (2*a*).

LIST OF REFERENCE SYMBOLS (1) combustion chamber
(2*a*) first reactor tube
(2*b*) second reactor tube
(3) catalyst
(4) burner
(5) electrically heatable heating element
(5*a*) inductively heatable heating element
(5*b*) electrical resistance heating element
(6) heating tube
(7*a*) metallic wire
(7*b*) metallic coating
(8) notches
(8*a*) contact face
(9) hydrocarbon-containing starting mixture
(10) steam
(11) synthesis gas mixture
(12) heating jacket
(13) electrical heating resistor
(13*a*) first electrical heating resistor
(13*b*) second electrical heating resistor
(13*i*) further i-th heating resistor with i greater/equal to 3 and i (integer)=3, 4, 5, 6, 7, . . .
(14) electrical contacting/mechanical securement
(15) protrusion/constriction of the first reactor tube

What is claimed is:

1. A reformer for the steam reforming of a hydrocarbon-containing mixture, at least comprising:
a combustion chamber,
a burner disposed within the combustion chamber,
a first reactor tube which is disposed at least sectionally within the combustion chamber,
a catalyst disposed within the first reactor tube, and
an electric heating element disposed within the first reactor tube, the electric heating element comprising an electrical resistance heating element,
wherein the electric heating element is spaced apart from the first reactor tube and the catalyst fills a space between the electric heating element and the first reactor tube.

2. The reformer of claim 1, further comprising a second reactor tube with a catalyst disposed within the second reactor tube, the second reactor tube free of a heating element.

3. The reformer of claim 1, wherein the first reformer tube has protrusions or constrictions in the region of the electric heating element.

4. The reformer of claim 1 wherein the electric heating element comprises an inductively heatable heating element.

5. The reformer of claim 4 wherein the inductively heatable heating element has at least one heating tube and a metallic wire or a metallic coating wound at least sectionally around the heating tube.

6. The reformer of claim 5 wherein some or all of the heating tube has a metallic surface.

7. The reformer of claim 5 wherein the metallic wire lies on the heating tube via notches.

8. The reformer of claim 5, wherein the heating tube is filled with the catalyst or with a second catalyst different from the catalyst.

9. The reformer of claim 5, wherein the ratio of the diameter of the first reactor tube, $\varnothing_{2a}$, to the diameter of the heating tube, $\varnothing_6$, expressed as $\varnothing_{2a}/\varnothing_6$, is from 100 to 2.

10. The reformer of claim 5 wherein the metallic wire and/or the metallic surface and/or the metallic coating comprises one or more of iron, cobalt, nickel, copper, silver, and chromium.

11. The reformer of claim 5 wherein the metallic wire and/or the metallic coating are connected to an electrical alternating current source.

12. The reformer of claim 1 wherein the catalyst is disposed within the first reactor tube and within the heating tube.

13. The reformer of claim 1, wherein the electrical resistance heating element comprises an electrical heating resistor and a heating jacket.

14. The reformer of claim 13, wherein the heating jacket comprises electrical insulators.

15. The reformer of claim 1, wherein the electrical resistance heating element comprises a first electrical heating resistor and a second electrical heating resistor.

16. The reformer of claim 1, wherein the electrical resistance heating element is disposed in the first reactor tube via an electrical contacting/mechanical securement.

17. A reformer for the steam reforming of a hydrocarbon-containing mixture, at least comprising:
a combustion chamber,
a burner disposed within the combustion chamber,
a first reactor tube which is disposed at least sectionally within the combustion chamber,
a catalyst disposed within the first reactor tube, and
an electric heating element disposed within the first reactor tube, the electric heating element comprising an electrical resistance heating element,
wherein the electric heating element is positioned radially inward of the first reactor tube and the catalyst spans an entire space between the electric heating element and the first reactor tube.

18. A reformer for the steam reforming of a hydrocarbon-containing mixture, at least comprising:
a combustion chamber,
a burner disposed within the combustion chamber, a first reactor tube which is disposed at least sectionally within the combustion chamber, a catalyst disposed within the first reactor tube, and an electric heating element disposed within the first reactor tube, the electric heating element comprising an electrical resistance heating element, wherein the electric heating element is spaced apart from the first reactor tube, the catalyst is disposed within a space between the electric heating element and the first reactor tube, and the catalyst is disposed between an exterior of the electric heating element and an interior of the first reactor tube.

\* \* \* \* \*